US007505063B1

(12) United States Patent
Bastedo et al.

(10) Patent No.: US 7,505,063 B1
(45) Date of Patent: Mar. 17, 2009

(54) SELF-ADJUSTING AND CENTERING CAMERA MOUNT FOR INSPECTING PIPE

(75) Inventors: Rodney Bastedo, Stratford, CT (US); Dario L. Cavallero, Pittsfield, MA (US); William D. Knowles, Pittsfield, MA (US); Brian D. Brazeau, N. Adams, MA (US)

(73) Assignees: Ronald A. Basterdo, Bridgeport, CT (US); Cavallero Plastics, Inc., Pittsfield, MA (US)

( * ) Notice: Subject to any disclaimer, the term of this patent is extended or adjusted under 35 U.S.C. 154(b) by 653 days.

(21) Appl. No.: 11/059,494

(22) Filed: Feb. 16, 2005

Related U.S. Application Data

(60) Provisional application No. 60/545,178, filed on Feb. 17, 2004.

(51) Int. Cl.
*H04N 7/18* (2006.01)
*H04N 5/225* (2006.01)
*B08B 9/02* (2006.01)
*F16L 45/00* (2006.01)
*F16L 55/44* (2006.01)

(52) U.S. Cl. .......................... 348/84; 348/373; 378/60; 15/104.05

(58) Field of Classification Search .................. 348/84, 348/85, 82, 207.1, 373, 375; 166/99, 170, 166/172, 174, 241.5; 378/59, 60; D32/14; 15/104.03, 104.05, 107.067, 104.069, 104.31, 15/104.33, 104.067
See application file for complete search history.

(56) References Cited

U.S. PATENT DOCUMENTS

| | | | | |
|---|---|---|---|---|
| 1,898,074 A | * | 2/1933 | Bailey | .................... 175/325.7 |
| 2,742,259 A | * | 4/1956 | Boucher | ................... 254/134.5 |
| 2,887,118 A | * | 5/1959 | Loeffler et al. | .............. 134/112 |
| 3,492,477 A | * | 1/1970 | Arnesen | ....................... 378/60 |
| 3,885,091 A | * | 5/1975 | Fish et al. | ...................... 348/84 |
| 3,904,878 A | * | 9/1975 | Burch et al. | ................... 378/60 |
| 3,977,468 A | * | 8/1976 | Brewer et al. | ............. 166/241.5 |
| 4,073,302 A | * | 2/1978 | Jones | ...................... 134/167 C |
| 4,537,136 A | * | 8/1985 | Douglas | ................... 104/138.2 |
| 4,557,327 A | * | 12/1985 | Kinley et al. | .............. 166/241.5 |
| 4,615,386 A | * | 10/1986 | Briscoe | .................... 166/241.5 |

(Continued)

FOREIGN PATENT DOCUMENTS

JP  09229868 A  *  9/1997

(Continued)

*Primary Examiner*—John M Villecco
(74) *Attorney, Agent, or Firm*—Fattibene and Fattibene; Paul A. Fattibene; Arthur T. Fattibene

(57) ABSTRACT

A mount for traveling within a pipe to center a tool, such as a camera, within the pipe. Inner and outer concentric cylinders are slidably nested. Pivoted leg pairs have one end connected to the outer cylinder and another end connected to the inner cylinder. The pivoted leg pairs move radially inward or outward as the inner and outer cylinder move axially with respect to each other. A spring biases wheels attached to the distal end of the pivoted leg pairs radially outward. The mount centers the inner and outer cylinder within the pipe and automatically adjusts to different diameters of pipes. The mount overcomes obstructions within the pipe and is easily retrievable. The interior of the pipe may be inspected or worked upon.

16 Claims, 7 Drawing Sheets

U.S. PATENT DOCUMENTS

| | | | | |
|---|---|---|---|---|
| 4,619,322 A | * | 10/1986 | Armell et al. | 166/241.5 |
| 4,722,001 A | * | 1/1988 | Rohrich et al. | 348/84 |
| 5,329,824 A | * | 7/1994 | Carapezza et al. | 73/866.5 |
| 5,358,040 A | * | 10/1994 | Kinley et al. | 166/241.3 |
| 5,971,404 A | * | 10/1999 | Stoves | 280/6.154 |
| 6,123,027 A | * | 9/2000 | Suyama et al. | 104/138.2 |
| 6,629,568 B2 | * | 10/2003 | Post et al. | 166/382 |
| 7,328,475 B2 | * | 2/2008 | Smith et al. | 15/104.061 |
| 2004/0183899 A1 | * | 9/2004 | Shiota | 348/84 |

FOREIGN PATENT DOCUMENTS

WO    WO 2006129977 A1 * 12/2006

* cited by examiner

SELF-ADJUSTING AND CENTERING CAMERA MOUNT FOR INSPECTING PIPE

RELATED APPLICATION

This application claims the benefit of U.S. Provisional Application No. 60/545,178, filed Feb. 17, 2004.

FIELD OF THE INVENTION

The present invention relates in general to the snaking of a camera in a pipe to visually inspect the pipe, and particularly to a camera mount that centers the camera within the pipe and automatically adjusts to different size pipes.

BACKGROUND OF THE INVENTION

In many applications such as plumbing, it is often necessary to inspect pipes that are not readily accessible. This is commonly done by inserting into the pipe a camera so that the interior of the pipe can be remotely viewed and inspected. Typically, a camera is mounted onto a sled or frame having flexible wires or whiskers that fit within the interior diameter of the pipe being inspected. While these prior devices have worked adequately, they often encounter difficulties in that there is often considerable friction in inserting these devices into pipes. Additionally, often the fixed sleds snag or catch irregularities in the pipe and are difficult to advance or withdraw from the pipe. They often get blocked due to turns or obstructions in the pipe which are not readily negotiated past. Therefore, the prior devices have only a limited range in which they can be pushed into the pipe. Typically, the camera is not necessarily centered within the pipe, which limits or distorts the view of the pipe for inspection. Also, multiple devices may be needed for a variety or range of pipe diameters.

Therefore, there is a need for a camera mount that readily adapts to different diameter pipes, as well as that can adapt to obstructions within the pipe as well as being easily pushed through the pipe with little friction.

SUMMARY OF THE INVENTION

The present invention relates to an adjustable self centering camera mount used for inspecting pipe. An inner cylinder is concentrically and telescopically placed within an outer cylinder. Three pivoted leg pairs have one end attached to the inner cylinder and another end attached to the outer cylinder so that upon relative motion between the inner and outer cylinders along their axes results in the distal ends of the pivoted leg pairs to move radially inward or outward. A spring attached to the inner and outer cylinders biases the inner and outer cylinders together and the distal end of the pivoted leg pairs radially outward.

A camera or other device, such as a tool, is mounted in the inner cylinder. The distal ends of the pivoted leg pairs have rotating wheels thereon. An extension member may be used to contain cabling for powering or receiving data signals from the camera and extends from the rear of the camera mount. Release cables may be attached to the distal end of the rear legs of the pivoted leg pairs so that upon pulling the release cable, the distal end of the rear pivoted leg pairs are collapsed radially inward, permitting easy withdrawal of the camera mount when the camera mount is desired to be removed from the interior of the pipe. Flashlights may be placed on the inner cylinder to provide illumination for the camera.

Accordingly, it is an object of the present invention to provide an adjustable, self centering mount for holding a camera and inspecting the interior surface of pipe.

It is a further object of the present invention to provide an automatically adjusting mount so as to adjust to possible obstructions in the pipe and to permit travel within the pipe with little friction.

It is an advantage of the present invention that it is easily pushed through a pipe.

It is yet another advantage of the present invention that it is easily retrieved from within the pipe.

It is a further advantage of the present invention that the camera is protected by the inner cylinder.

It is a feature of the present invention that concentric sliding cylinders are used.

It is another feature of the present invention that pivoted leg pairs are connected to the inner and outer cylinders.

It is a further feature of the present invention that rotating wheels are placed on the distal ends of the pivoted leg pairs.

It is yet another feature of the present invention that a spring is used to bias the inner and outer cylinders together, causing the pivoted leg pairs to extend radially outward.

These and other objects, advantages, and features will become readily apparent in view of the following, more detailed description.

BRIEF DESCRIPTION OF THE PREFERRED EMBODIMENTS

Figure 1:
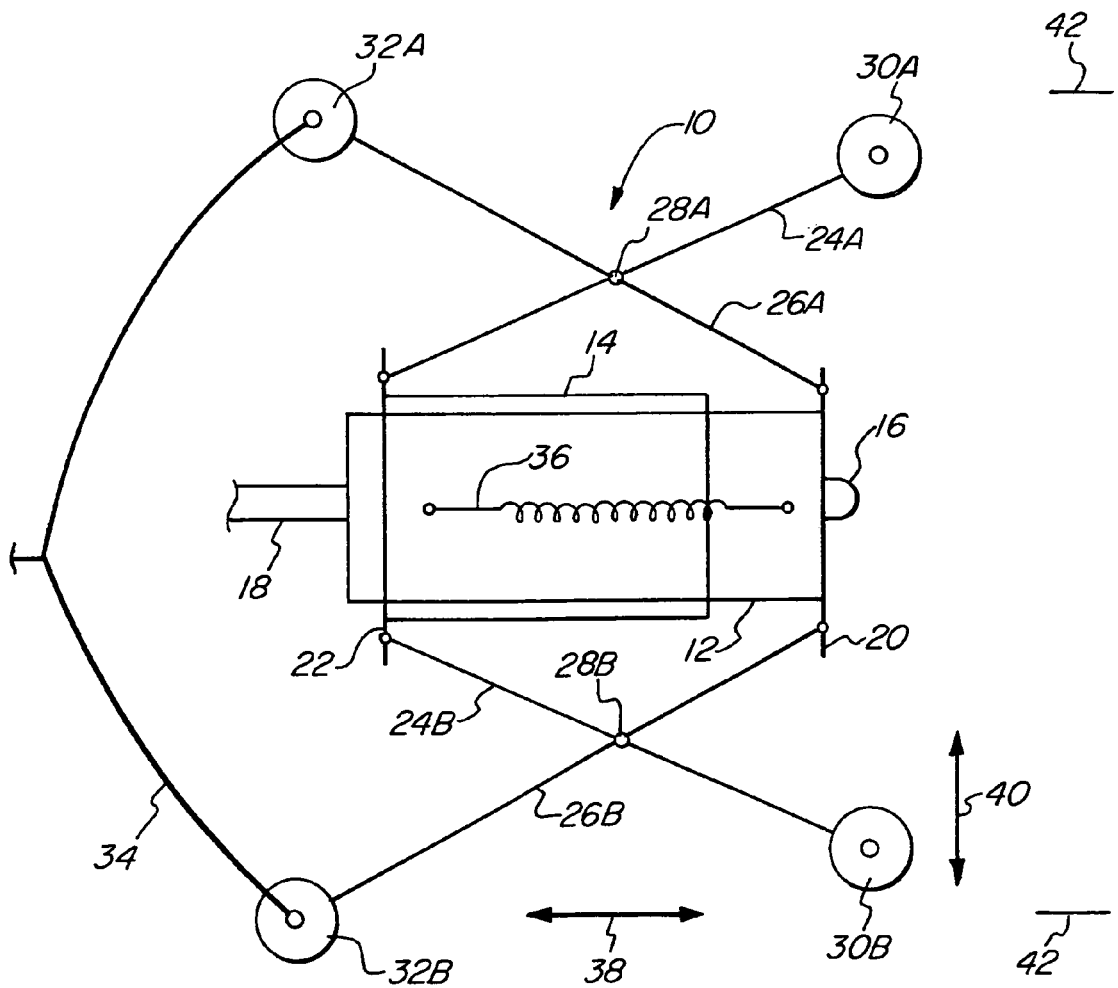
FIG. 1 schematically illustrates the present invention.

FIG. 1 schematically illustrates the camera mount 10 of the present invention. The camera mount 10 of the present invention is used to place a camera in pipes of different diameters. The camera mount 10 is self-adjusting so as to always center the camera within the pipe and to automatically adjust for different sized pipes. The camera mount 10 is comprised of an inner housing or an inner cylinder 12 and an outer housing or outer cylinder 14 that are slidably engaged with each other. A camera 16 is mounted within the inner cylinder 12 at one end. Power and video cables 18 extends out of the other end of the inner cylinder 12. The power and video cables 18 may be sufficiently rigid to force the camera mount 10 forward within a pipe 42. A flange 20 is placed on the inner cylinder 12 and is used for attaching a leg 26A and a leg 26B. The legs are pivotally attached to the flange 20. A flange 22 is attached to the outer cylinder 14. The flange 22 is used to pivotally attach second legs 24A and 24B. A first pair of legs 24A and 26A is pivotally connected at a middle portion by pivot 28A. On each distal end of the legs 24A and 26B are placed wheels 30A and 32A respectively. Similarly, a second pair of legs 24B and 26B is pivotally connected at a central portion by pivot 28B. On the distal end of the legs 24B and 26B are placed wheels 30B and 32B, respectively. A release cable 34 is attached to the wheels 32A and 32B.

A spring 36 is connected on one end to the inner cylinder 12 and on the other end to the outer cylinder 14. The spring 36 biases the two cylinders 12 and 14 together. In this configuration, the two cylinders 12 and 14 can move relative to each other along their longitudinal axis in the direction of arrow 38. The wheels 30A, 30B, 32A, 32B are linked to the inner and outer cylinders 12 and 14, resulting in movement in the wheels 30A, 30B, 32A, 32B moving in the direction of arrow 40, perpendicular to the direction of movement of the inner and outer cylinders 12 and 14. The spring 36 biases the inner and outer cylinders 12 and 14 together, resulting in the wheels 30A, 30B, 32A and 32B being biased away from each other. As a result, as the wheels 30A and 30B enter the opening of a pipe 42, the distance between the wheels will be adjusted against the bias force of the spring 36, resulting in a centering of the camera 16 within the diameter of the pipe 42. Should the diameter of the pipe 42 change, the wheels 30A, 30B, 32A and 32B will continue to maintain contact with the inner surface of the pipe, keeping the camera 16 centered. In the event that the camera mount may become stuck within the pipe 42, the release cable attached to the wheels 32A and 32B can be pulled, which will cause the legs 24A, 24B, 26A, 26B to collapse, permitting the camera mount 10 to be withdrawn from the pipe 42. While only two pairs of leg have been illustrated in FIG. 1, it should be appreciated that normally three or more pairs of legs will preferably be used equally spaced about the perimeter of the inner and outer cylinders 12 and 14.

Figure 2:
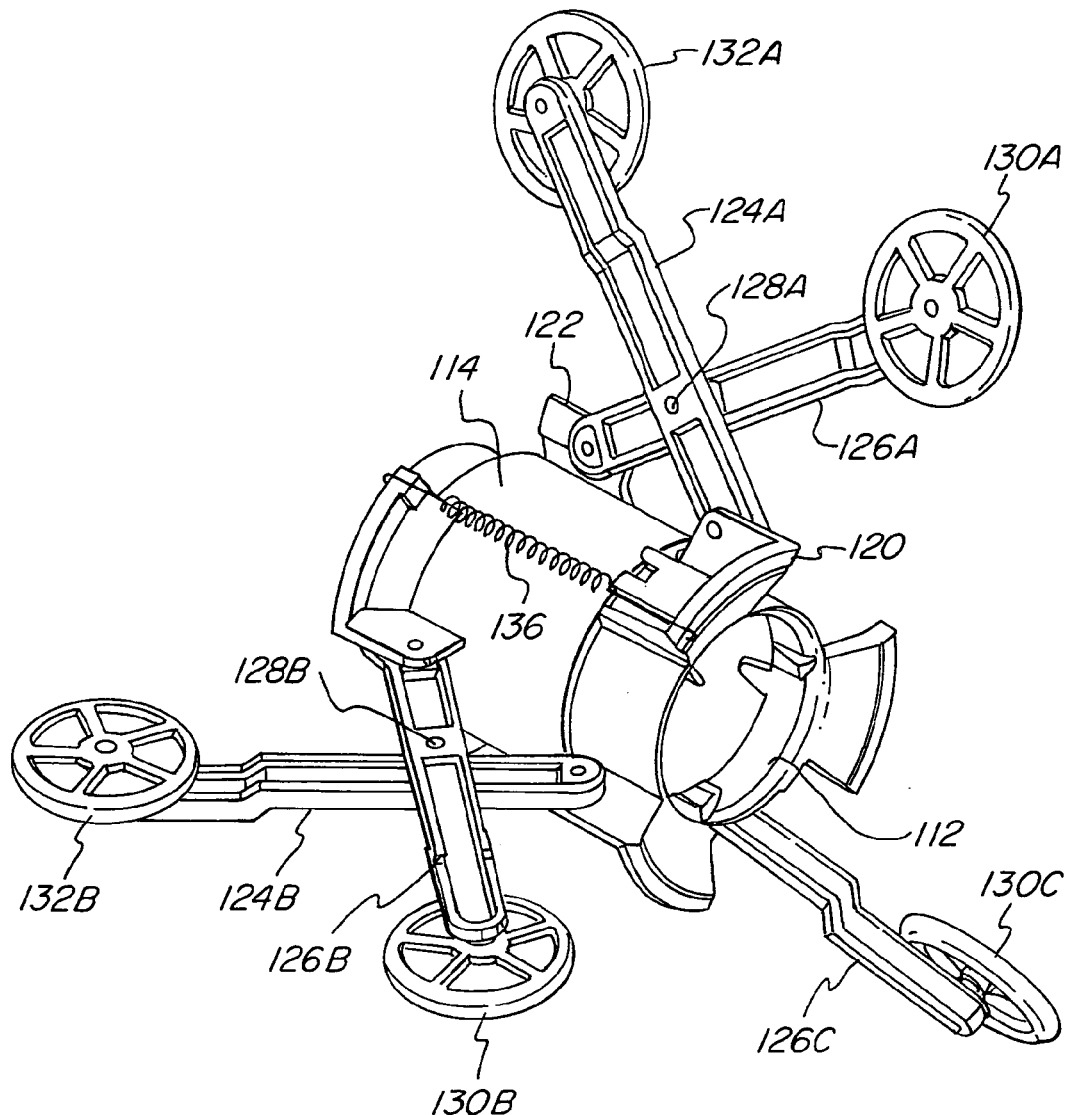
FIG. 2 is a perspective view illustrating an embodiment of the present invention in an open position.
Figure 3:
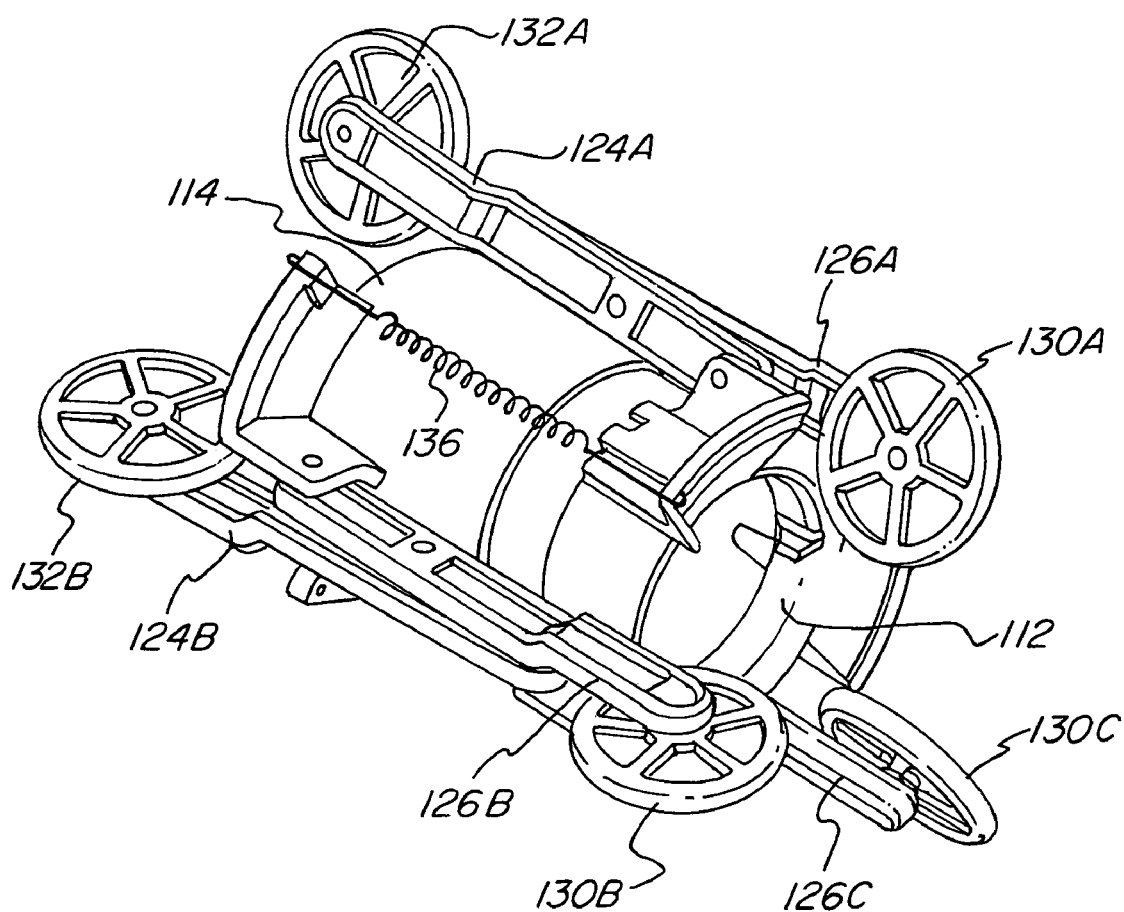
FIG. 3 is a perspective view illustrating the embodiment illustrated in FIG. 2 in a closed position.

FIG. 2 and FIG. 3 illustrate another embodiment of the present invention. In FIG. 2, the camera mount is illustrated in an open position, and in FIG. 3 the camera mount is illustrated in a closed position. Inner cylinder 112 is placed within the outer cylinder 114 and is permitted to slide there along. Spring 136 causes the two cylinders 112 and 114 to be brought together. The legs 124A and 124B are attached to flange 120 attached to the inner cylinder 112. The legs 126A, 126B and 126C are attached to a flange 122 attached to the outer cylinder 114. Each of the legs 124A, 124B, 126A, 126B and 126C have wheels 130A, 130B, 130C and 132A, 132B attached thereto. In this embodiment, three pairs of legs are illustrated with each set being pivoted about a pivot point, pivots 128A and 128B illustrated, the pair of legs formed from leg 126C is not fully shown. Preferably, at least three sets of legs are utilized, equally spaced about the circumference of the inner and outer cylinders 112 and 114.

Figure 4:
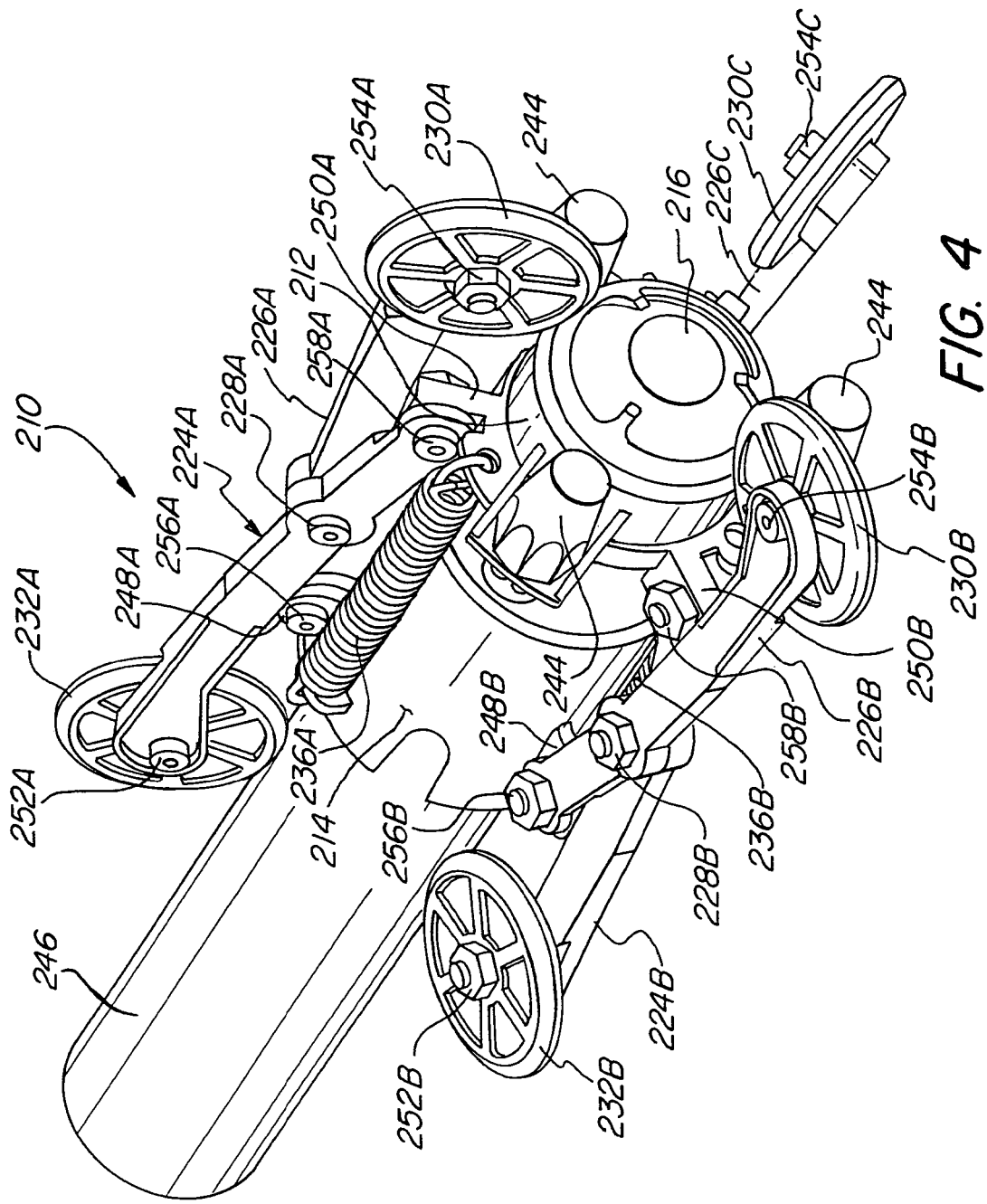
FIG. 4 is a perspective view illustrating another embodiment of the present invention.

FIG. 4 illustrates a camera mount 210 of another embodiment of the present invention. This embodiment is substantially similar to the prior embodiments, however, this embodiment is of a slightly different configurations. An inner cylinder 212 is nested or concentrically placed within an outer cylinder 214. The outer cylinder 214 has a slightly larger inside diameter than the outside diameter of the inner cylinder 212. Placed on the inner cylinder 212 are inner cylinder supports 250A and 250B. The inner cylinder supports 250A and 250B are used as a structural element or member to hold leg 224A and leg 224B as well as to hold one end of spring 236A. Outer cylinder supports 248A and 248B are formed on the outer cylinder 214 and are used as a structural element or member to hold one end of legs 226A and 226B respectively. The support 248A is also used to hold the other end of spring 236A.

A first pivoted leg pair comprising legs 226A and 224A is attached at one end to the support 250A by fastener 258A and on another end to the support 248A by fastener 256A. Intermediate each leg 226A and 224A is a pivoting fastener 228A. On the distal end of each of the legs 226A and 224A are wheels 230A and 232A, which are held onto the respective distal end of the legs by fasteners 254A and 252A. A second pivoted leg pair comprising leg 226B and 224B is similarly attached at one end to support 248B and support 250B by fasteners 256B and 258B respectively. Intermediate each of the legs 226B and 224B is a pivot fastener 228B. Similarly, the distal end of each leg 226B and 224B has a wheel 230B and 232B rotatably mounted thereon with fasteners 252B and 254B. A spring 236B, only partially illustrated, has one end attached to support 250B and the other end to support 248B. A similar pivoted leg pair is also utilized with only the leg 226C and the wheel 230C and fastener 254C visible in FIG. 4. Flashlights 244 may also be mounted on the inner cylinder 212 to provide illumination within the pipe. An extension member 246 may be attached to the outer cylinder 214 to provide additional stability and to guide the cabling, not illustrated in FIG. 4, required to power or receive signals from a camera or other tool mounted within the inner cylinder 212. The extension member 246 may be attached to the outer cylinder 214 by any fastening means, such as thumb screws. Opening 216 permits the camera or any other tool to be used.

Figure 5:
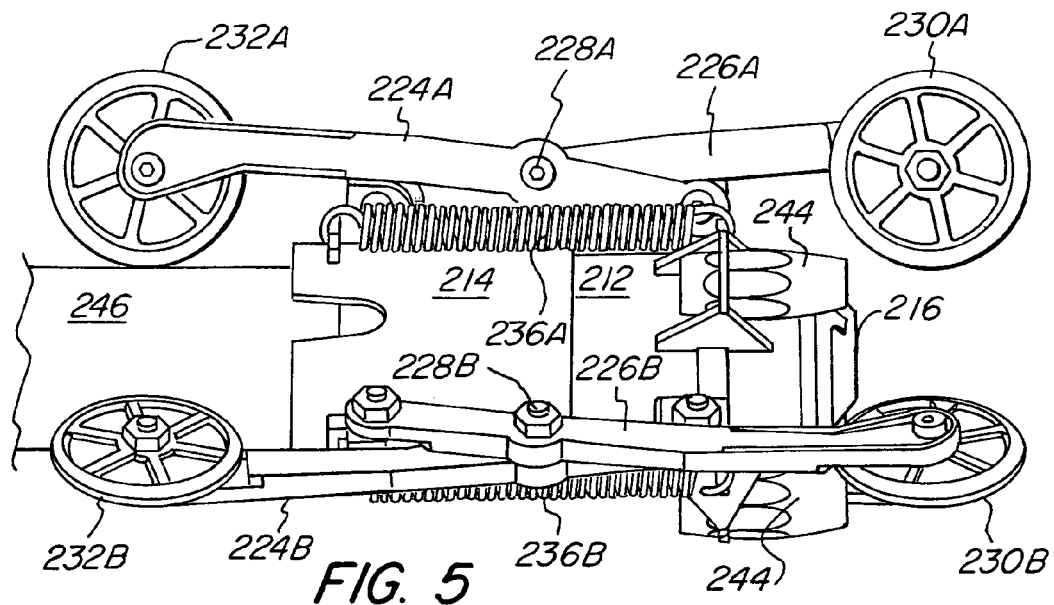
FIG. 5 is a side elevational view illustrating the embodiment of the present invention illustrated in FIG. 4.

FIG. 5 is a side elevational view illustrating the embodiment of the mount illustrated in FIG. 4. FIG. 5 better illustrates the spring 236B.

Figure 6:
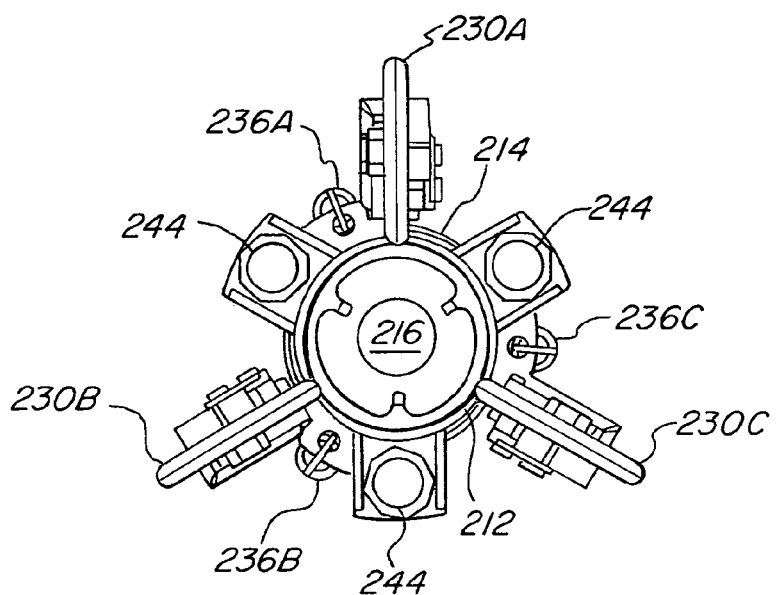
FIG. 6 is a front elevational view illustrating the embodiment of the present invention illustrated in FIG. 4.

FIG. 6 is a front elevational view of the embodiment illustrated in FIGS. 4 and 5. In FIG. 6, the arrangement or configuration of the plurality of pivoted leg pairs is better illustrated. Each of the three wheels 230A, 230B and 230C are mounted on a pivoted leg pair equally spaced around the circumference of the inner cylinder 212 and the outer cylinder 214. Additionally illustrated is a third spring 236C.

Figure 7:
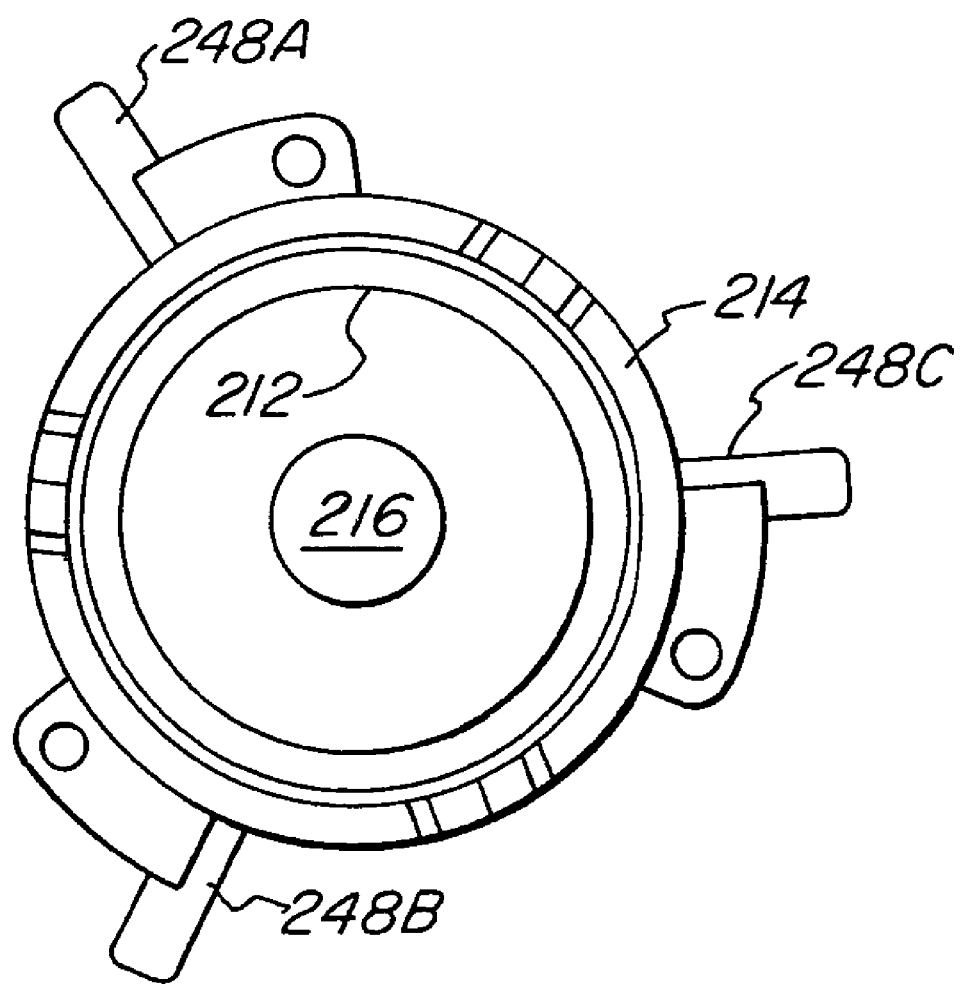
FIG. 7 is a rear elevational end view illustrating a portion of the embodiment of the invention illustrating the inner and outer cylinders.

FIG. 7 more clearly illustrates the inner cylinder 212 and outer cylinder 214 assembly. FIG. 7 only illustrates a portion of the invention. FIG. 7 is an end elevational view with the inner cylinder 212 placed within the outer cylinder 214. The supports 248A, 248B and 248C are also clearly illustrated. The outer diameter of the inner cylinder 212 is sized to slidably fit within the inner diameter of the outer cylinder 214. Opening 216 can be seen at the far end of this end view.

Figure 8:
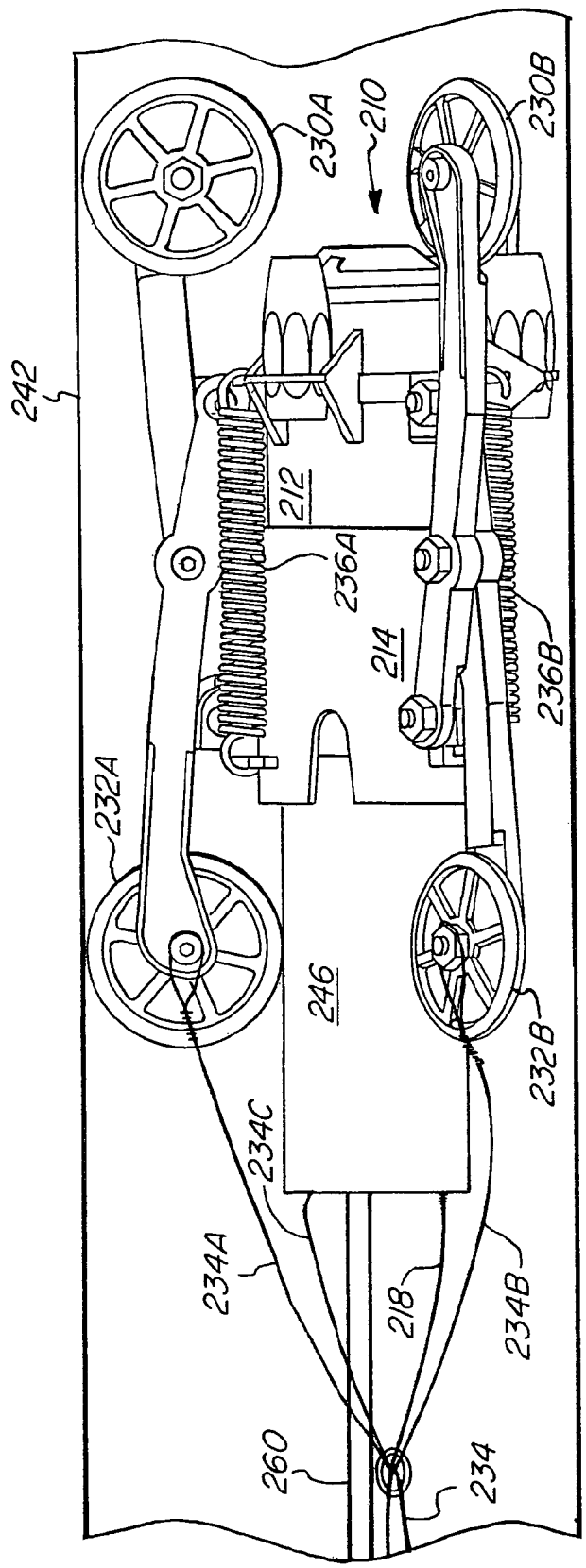
FIG. 8 illustrates use of the present invention inside a pipe.

FIG. 8 illustrates the placement of the camera mount 210 within a pipe 242. The wheels 230A and 232A are biased against the inside surface of pipe 242 by spring 236A. Similarly, wheels 230B and 232B are biased against the interior surface of the pipe 242 by spring 236B. Extending from the extension member 246 and attached to the camera mount 212, or a camera within the camera mount 210, is a flexible fiberglass pushing rod 260. The flexible fiberglass pushing rod 260 is used to push the camera mount 210 into the pipe 242. Also extending from the extension member 246 are power and signal cables 218.

Release cables 234A, 234B, and 234C are attached to the rearmost wheels 232A, 232B, and a third wheel hidden from view. The release cable 234A, 234B and 234C are brought together and coupled by a ring having a single release cable 234 extending there from. The release cable 234 is used to extract the camera mount 210 from the pipe 242 when desired. Upon pulling on the release cable 234, the tension within the release cables 234A, 234B and 234C causes the wheels 232A, 230A, 232B and 230B to move radially inward resulting in easy extraction of the camera mount 210. The operation of the release cable 234 has the advantage that should an obstruction be encountered, the pulling force applied to the release cable 234 in an effort to extract the camera mount 210 from the pipe results in the wheels 232A, 230A, 232B and 230B to be forced radially inward so as to easily bypass any potential obstruction. It is therefore assured that the camera mount 210 can be retrieved.

Referring to the camera mount illustrated in FIGS. 4-8, the three pivoted leg pairs are in a retracted or radially inward position when the springs 236A, 236B, and 236C are in an extended state. The springs 236A, 236B, and 236C bias or pull the inner cylinder 212 and the outer cylinder 214 together, causing the wheels attached to the pivoted leg pairs to be forced radially outward. Accordingly, when placed within a pipe, the wheels are biased radially outward until contacting the interior surface of the pipe. This results in the opening 216 being centered within the pipe. The force or tension in the springs 236A, 236B and 236C may be selected so as to provide sufficient force so as to assure that the wheels 230A, 230B, 232A, 232B contact the inner surface of the pipe 242 and yet are sufficiently compliant so as to move radially inward should any obstruction or reduced pipe diameter be encountered. Accordingly, the structure of the present invention results in a self-correcting mechanism so as to easily accommodate obstructions or varying diameters within the pipe 242, and yet maintain the camera mount 210 centered within the pipe.

The present invention, in providing nested or telescoping inner and outer cylinders, coupled to pivoted leg pairs provides a relatively simple structure that makes possible the centering of a mount for holding a camera or other tool centrally within a pipe being inspected or repaired. The biasing of the pivoted leg pairs in the present invention permits the mount to be automatically self-centering, irrespective of the pipe diameter. Additionally, the structure of the present invention, in permitting the pivoted leg pairs to be collapsible, improves the ability of the mount to overcome obstacles as well as assures retrieval of the mount once deployed in a pipe. The present invention may be adapted to accommodate any pipe size, and has been used and is particularly suited to pipes ranging in size from 6 inches or 15.24 cm to 12 inches or 30.48 cm. The present invention may be made of any material but is preferably made of a corrosion resistant material such as stainless steel and plastic. Additionally, while the present invention has been described primarily with respect to a camera mount, it should readily be appreciated that the present invention may serve as a platform or mount for any desired tool that might be used or placed within a pipe.

Accordingly, while the present invention has been described with respect to several preferred embodiments, it will be obvious to those skilled in the art that various modifications may be made without departing from the spirit and scope of this invention.

What is claimed is:

1. An adjustable self-centering mount for use in a pipe comprising:
   an outer tube;
   an inner tube placed within the outer tube, said outer tube covering a portion of said inner tube;
   a spring biasing the inner and outer tubes together; and
   a plurality of pivoted leg pairs having one end attached to the inner tube and another end attached to the outer tube, and each of said plurality of pivoted leg pairs having a pivot at a middle portion of each leg of the pivoted leg pairs coupling each leg of the pivoted leg pairs together at the middle portion,
   whereby movement of the inner tube relative to the outer tube causes ends of said plurality of pivoted leg pairs to move away from or towards said outer tube.

2. An adjustable self-centering mount as in claim 1 wherein:
   said inner and outer tubes are cylindrical.

3. An adjustable self-centering mount as in claim 2 wherein:
   said plurality of pivoted leg pairs are spaced equidistant around the circumference of said inner and outer tubes.

4. An adjustable self-centering mount as in claim 1 further comprising:
   wheels placed on distal ends of each of said plurality of pivoted leg pairs.

5. An adjustable self-centering mount as in claim 1 further comprising:
   a camera placed in said inner tube.

6. An adjustable self-centering mount as in claim 1 further comprising:
   a light attached to said inner tube.

7. An adjustable self-centering mount as in claim 1 wherein:
   said plurality of pivoted leg pairs comprise three.

8. An adjustable self-centering mount as in claim 1 further comprising:
   an extension member extending from said outer tube.

9. An adjustable self-centering mount for use in performing work within a pipe comprising:
   an outer cylinder;
   an inner cylinder placed within the outer cylinder, said outer cylinder covering a portion of said inner cylinder;
   a spring biasing said inner and outer cylinders together;
   a plurality of pivoted leg pairs having one end attached to the inner cylinder and another end attached to the outer cylinder, and each of said plurality of pivoted leg pairs having a pivot at a middle portion of each leg of the pivoted leg pairs coupling each leg of the pivoted leg pairs together at the middle portion; and
   a pair of wheels attached to distal ends of each of said plurality of pivoted leg pairs,
   whereby movement of the inner cylinder relative to the outer cylinder causes the distal ends of said plurality of pivoted leg pairs to move away from or towards said inner and outer cylinders.

10. An adjustable self-centering mount as in claim 9 further comprising:
    a camera placed in said inner cylinder.

11. An adjustable self-centering mount as in claim 9 further comprising:
    a light attached to said inner cylinder.

12. An adjustable self-centering mount as in claim 9 wherein:
    said plurality of pivoted leg pairs comprise three pivoted leg pairs spaced equidistant around the circumference of said inner and outer cylinders.

13. An adjustable self-centering mount as in claim 9 further comprising:
    an extension member extending from said outer cylinder.

14. An adjustable self-centering mount comprising:
    an outer tube;
    an inner tube placed within the outer tube;
    a spring biasing the inner and outer tubes together;
    a plurality of pivoted leg pairs having one end attached to the inner tube and another end attached to the outer tube;
    wheels placed on distal ends of each of said plurality of pivoted leg pairs; and
    a release cable attached to at least two of said wheels,
    whereby movement of the inner tube relative to the outer tube causes ends of said plurality of pivoted leg pairs to move away from or towards said outer tube.

15. An adjustable self-centering mount comprising:
an outer cylinder;
an inner cylinder placed within the outer cylinder;
a spring biasing said inner and outer cylinders together;
a plurality of pivoted leg pairs having one end attached to the inner cylinder and another end attached to the outer cylinder;
a pair of wheels attached to distal ends of each of said plurality of pivoted leg pairs; and
a release cable attached to at least two of said pair of wheels,
whereby movement of the inner cylinder relative to the outer cylinder causes the distal ends of said plurality of pivoted leg pairs to move away from or towards said inner and outer cylinders.

16. An adjustable self-centering camera mount for use in inspecting the interior of a pipe comprising:
an outer cylinder;
a first outer cylinder support attached to said outer cylinder;
a second outer cylinder support attached to said outer cylinder;
a third outer cylinder support attached to said outer cylinder;
an inner cylinder slidably placed within said outer cylinder;
a first inner cylinder support attached to said inner cylinder;
a second inner cylinder support attached to said inner cylinder;
a third inner cylinder support attached to said inner cylinder;
a first spring attached to said first outer cylinder support and said first inner cylinder support;
a second spring attached to said second outer cylinder support and said second inner cylinder support;
a third spring attached to said third outer cylinder support and said third inner cylinder support, whereby said first, second, and third springs bias the inner and outer cylinders together;
a first pivoted leg pair having one end attached to said first outer cylinder support and another end attached to said first inner cylinder support, whereby distal ends of said first pivoted leg pair move radially upon relative axial movement of said outer and inner cylinders;
a second pivoted leg pair having one end attached to said second outer cylinder support and another end attached to said second inner cylinder support, whereby distal ends of said second pivoted leg pair move radially upon relative axial movement of said outer and inner cylinders;
a third pivoted leg pair having one end attached to said third outer cylinder support and another end attached to said third inner cylinder support, whereby distal ends of said third pivoted leg pair move radially upon relative axial movement of said outer and inner cylinders;
a first pair of wheels placed on the distal ends of said first pivoted leg pair;
a second pair of wheels placed on the distal ends of said second pivoted leg pair;
a third pair of wheels placed on the distal ends of said third pivoted leg pair;
a release cable attached to one of each of said first, second, and third pairs of wheels, whereby upon pulling on said release cable the distal ends of said first, second, and third pivoted leg pairs move radially inward; and
a flashlight mount attached to said inner cylinder.

* * * * *

UNITED STATES PATENT AND TRADEMARK OFFICE
CERTIFICATE OF CORRECTION

PATENT NO.         : 7,505,063 B1
APPLICATION NO. : 11/059494
DATED              : March 17, 2009
INVENTOR(S)        : Bastedo et al.

Page 1 of 1

It is certified that error appears in the above-identified patent and that said Letters Patent is hereby corrected as shown below:

On the Title page, item (73) Assignee Ronald A. Basterdo should read
--Ronald A. Bastedo--.

Signed and Sealed this

Twenty-fourth Day of November, 2009

David J. Kappos
*Director of the United States Patent and Trademark Office*